(12) United States Patent
Qu et al.

(10) Patent No.: US 10,805,133 B2
(45) Date of Patent: Oct. 13, 2020

(54) METHOD AND APPARATUS FOR DETERMINING PEAK POWER, PEAK-TO-AVERAGE POWER RATIO

(71) Applicant: Triductor Technology (Suzhou) Inc., Jiangsu (CN)

(72) Inventors: Junjie Qu, Jiangsu (CN); Yaolong Tan, Jiangsu (CN)

(73) Assignee: Triductor Technology (Suzhou) Inc., Suzhou, Jiangsu (CN)

( * ) Notice: Subject to any disclaimer, the term of this patent is extended or adjusted under 35 U.S.C. 154(b) by 0 days.

(21) Appl. No.: 16/318,807

(22) PCT Filed: May 9, 2017

(86) PCT No.: PCT/CN2017/083545
§ 371 (c)(1),
(2) Date: Jan. 18, 2019

(87) PCT Pub. No.: WO2018/014631
PCT Pub. Date: Jan. 25, 2018

(65) Prior Publication Data
US 2019/0190760 A1   Jun. 20, 2019

(30) Foreign Application Priority Data
Jul. 19, 2016 (CN) .......................... 2016 1 0566705

(51) Int. Cl.
*H04L 27/26* (2006.01)
*H04B 17/10* (2015.01)
(Continued)

(52) U.S. Cl.
CPC ....... *H04L 27/2614* (2013.01); *H04B 17/104* (2015.01); *H04B 17/26* (2015.01); *H04B 17/309* (2015.01)

(58) Field of Classification Search
CPC .... H04B 17/104; H04B 17/26; H04B 17/309; H04L 27/2614
See application file for complete search history.

(56) References Cited

U.S. PATENT DOCUMENTS

| 5,530,712 A | 6/1996 | Solina et al. |
| 6,522,869 B1 | 2/2003 | Hiramatsu et al. |
| (Continued) | | |

FOREIGN PATENT DOCUMENTS

| CN | 1266568 A | 9/2000 |
| CN | 101072057 A | 11/2007 |
| (Continued) | | |

OTHER PUBLICATIONS

International Search Report, PCT Patent Application No. PCT/CN2017/083545, dated Jul. 25, 2017, 4 pages.
(Continued)

*Primary Examiner* — David B Lugo
(74) *Attorney, Agent, or Firm* — Adam R. Stephenson, Ltd.

(57) ABSTRACT

The invention relates to the field of signal processing, and particularly to method and apparatus for determining a peak power, a peak-to-average power ratio. The method for determining the peak power comprises: obtaining a sampling power at a current sampling time; comparing the sampling power at the current sampling time with an estimated peak power at the current sampling time; and when the sampling power at the current sampling time is greater than the estimated peak power at the current sampling time, determining the sampling power at the current sampling time as an actual peak power at the current sampling time. With the present invention, detection efficiency of the peak power is improved, and the peak power can be determined in real time at each sampling time.

9 Claims, 4 Drawing Sheets

(51) Int. Cl.
H04B 17/309 (2015.01)
H04B 17/26 (2015.01)

(56) References Cited

U.S. PATENT DOCUMENTS

2007/0041459 A1    2/2007  Yeon et al.
2013/0177060 A1*   7/2013  Ben Ayun ............ H04B 1/1027
                                                    375/224
2013/0301428 A1*  11/2013  Weng ................... H04W 52/52
                                                    370/252
2018/0331873 A1*  11/2018  Andre .................. H04B 1/0067
2019/0190760 A1    6/2019  Qu et al.

FOREIGN PATENT DOCUMENTS

| CN | 101741787 A | 6/2010 |
| CN | 102510566 A | 6/2012 |
| CN | 102970266 A | 3/2013 |
| CN | 106452621 A | 2/2017 |

OTHER PUBLICATIONS

Written Opinion, PCT Patent Application No. PCT/CN2017/083545, dated Jul. 25, 2017, 4 pages.
Notification of First Office Action, Chinese Patent Application No. 2016105667059, dated Oct. 10, 2017, 6 pages.
Notification of Second Office Action, Chinese Patent Application No. 2016105667059, dated Nov. 16, 2017, 3 pages.
Unknown, The Design of a Portable True Peak Power Meter, Process Automation Instrumentation, vol. 27, No. 9, Sep. 2006, pp. 33-35.

* cited by examiner

METHOD AND APPARATUS FOR DETERMINING PEAK POWER, PEAK-TO-AVERAGE POWER RATIO

CROSS REFERENCE TO RELATED APPLICATIONS

This document claims the benefit of the filing date of Chinese Patent application No. 201610566705.9 to Qu et al, entitled "Method and Apparatus for Determining Peak Power, Peak-To-Average Power Ratio," filed Jul. 16, 2016, the disclosure of which is hereby incorporated entirely herein by reference.

This application is also a Section 371 National Stage application of the earlier Patent Cooperation Treaty Application to Qu et al., entitled "Method and Apparatus for Determining Peak Power, Peak-To-Average Power Ratio," application serial number PCT/CN2017/083545, filed May 9, 2017, now pending, the disclosure of which is hereby incorporated entirely herein by reference.

BACKGROUND

1. Technical Field

The invention relates to the field of signal processing, in particular to a method and apparatus for determining a peak power and a peak-to-average power ratio.

2. Background

The Peak to Average Power Ratio (PAPR) of a signal refers to the ratio of the instantaneous peak power to the average power of the signal, simply as the peak-to-average power ratio of the signal. The peak-to-average power ratio of the received signal has a significant influence on the front-end design of a communication receiver. The variation in the peak-to-average power ratio of the received signal needs to be considered in the dynamic range of an analog signal amplifier and an analog-to-digital converter, and the adjustment strategy of automatic gain control, so that a design index or scheme with the optimal cost performance can be determined. The peak-to-average power ratio of the received signal depends on the composition of a desired signal (namely, the transmitted signal) and channel interference. The peak-to-average power ratio of a single-carrier modulated transmitted signal is usually much lower than that of an orthogonal frequency-division-modulated (OFDM) transmitted signal, and the impulse noise interference in the channel interference has direct and decisive influence on the peak-to-average power ratio of the received signal. For a certain communication system, the peak-to-average power ratio of the transmitted signal has a certain range, but the channel interference cannot be predefined, resulting in an uncertain variation range of the peak-to-average power ratio of the received signal. Therefore, the peak-to-average power ratio of the received signal needs to be detected online in real time.

It is difficult to determine the peak power of a signal for the detection of the peak-to-average power ratio of the signal. At present, the peak power of a signal is usually determined by comparing the sampling power of each sampled signal with the previous sampling power one by one so as to determine whether the sampling power of the current sampling is the current peak power. Although the processing manner is high in accuracy, the detection efficiency of the peak power is lower because multiple comparison calculations are required in each sampling, which further affects the real-time detection of the peak-to-average power ratio.

SUMMARY

In order to solve the technical problem that in the prior art, the detection efficiency of peak power is low, the invention provides a method and apparatus for determining a peak power and a peak-to-average power ratio.

On one hand, the method for determining a peak power comprises the following steps of obtaining a sampling power at a current sampling time; comparing the sampling power at the current sampling time with an estimated peak power at the current sampling time; and when the sampling power at the current sampling time is greater than the estimated peak power at the current sampling time, determining that the sampling power at the current sampling time is an actual peak power at the current sampling time.

The method further comprises the following steps that when the sampling power at the current sampling time is less than or equal to the estimated peak power at the current sampling time, determining that an actual peak power at a previous sampling time is an actual peak power at the current sampling time.

Further, after the sampling power at the current sampling time is obtained, the method further comprises the following steps of: delaying the sampling power at the current sampling time by N sampling periods, wherein N is greater than 0; and the step of comparing the sampling power at the current sampling time with the estimated peak power at the current sampling time comprises: comparing the delayed sampling power with the estimated peak power at the current sampling time, and when the delayed sampling power is greater than the estimated peak power at the current sampling time, determining that the sampling power at the current sampling time is greater than the estimated peak power at the current sampling time.

The method further comprises: when the delayed sampling power is greater than the estimated peak power at the current sampling time, determining that the delayed sampling power is an estimated peak power at the next sampling time after the current sampling time; when the delayed sampling power is less than or equal to the estimated peak power at the current sampling time, comparing the estimated peak power at the current sampling time with a first power attenuation step value, wherein the first power attenuation step value is used for representing an attenuation degree of the estimated peak power at the current sampling time; and when the estimated peak power at the current sampling time is greater than the first power attenuation step value, using the difference value between the estimated peak power at the current sampling time and the first power attenuation step value as an estimated peak power at the next sampling time after the current sampling time.

The method further comprises the following steps: when the estimated peak power at the current sampling time is less than or equal to the first power attenuation step value, setting the estimated peak power at the next sampling time after the current sampling time to be 0.

The method further comprises the steps: when the delayed sampling power is greater than the estimated peak power at the current sampling time, multiplying the delayed sampling power by an attenuation coefficient to obtain an attenuation step value of the estimated peak power at the current sampling time, wherein the attenuation coefficient is greater than 0 and less than 1; and when the delayed sampling power is less than or equal to the estimated peak power at the current sampling time, using the first power attenuation step value as an attenuation step value of the estimated peak power at the next sampling time after the current sampling time.

Further, the attenuation coefficient is a constant value or gradually decreases with the sampling time.

Further, before comparing the sampling power at the current sampling time with the estimated peak power at the current sampling time, the method further comprises the steps of: comparing the sampling power at the previous sampling time with an estimated peak power at the previous sampling time; when the sampling power at the previous sampling time is greater than the estimated peak power at the previous sampling time, determining that the sampling power at the previous sampling time is the estimated peak power at the current sampling time; when the sampling power at the previous sampling time is less than or equal to the estimated peak power at the previous sampling time, comparing the estimated peak power at the previous sampling time with a second power attenuation step value, wherein the second power attenuation step value is used for representing an attenuation degree of the estimated peak power at the previous sampling time; when the estimated peak power at the previous sampling time is greater than the second power attenuation step value, using the difference value between the estimated peak power at the previous sampling time and the second power attenuation step value as the estimated peak power at the current sampling time; and when the estimated peak power at the previous sampling time is less than or equal to the second power attenuation step value, setting the estimated peak power at the current sampling time to be 0. On the other hand, the invention provides a method for determining a peak-to-average power ratio. The method comprises the following steps of: calculating an average power at a current sampling time; determining the actual peak power at the current sampling time by using the method for determining the peak power; and dividing the actual peak power at the current sampling time by the average power at the current sampling time to obtain a peak-to-average power ratio at the current sampling time.

Further, the average power at the current sampling time is obtained by the following formula:

$$P_{avg}(kT)=(1-u_2)\cdot P_{avg}(kT-T)+u_2\cdot P_s(kT)$$

wherein, kT represents the current sampling time, $P_{avg}(kT)$ represents the average power at the current sampling time, T represents a sampling period, $P_{avg}(kT-T)$ represents the average power at the previous sampling time before the current sampling time, $P_s(kT)$ represents the sampling power at the current sampling time, $u_2$ represents a weight coefficient of the sampling power at the current sampling time, and $u_2$ is greater than 0 and less than 1.

On the other hand, the invention provides 11. an apparatus for determining a peak power. The apparatus comprises an obtaining unit for obtaining a sampling power at a current sampling time; a first comparing unit for comparing the sampling power at the current sampling time with an estimated peak power at the current sampling time; and a first determining unit for determining that the sampling power at the current sampling time is an actual peak power at the current sampling time when the sampling power at the current sampling time is greater than the estimated peak power at the current sampling time.

The first determining unit is further used for determining that an actual peak power at a previous sampling time is an actual peak power at the current sampling time when the sampling power at the current sampling time is less than or equal to the estimated peak power at the current sampling time.

Further, the apparatus also comprises a delaying unit which is used for, after the sampling power at the current sampling time is obtained, delaying the sampling power at the current sampling time by N sampling periods, wherein N is greater than 0; and the first comparing unit is used for comparing the delayed sampling power with the estimated peak power at the current sampling time, and when the delayed sampling power is greater than the estimated peak power at the current sampling time, determining that the sampling power at the current sampling time is greater than the estimated peak power at the current sampling time.

Further, the apparatus also comprises a second determining unit which is used for determining that the delayed sampling power is an estimated peak power at the next sampling time after the current sampling time when the delayed sampling power is greater than the estimated peak power at the current sampling time; a second comparing unit which is used for comparing the estimated peak power at the current sampling time with a first power attenuation step value when the delayed sampling power is less than or equal to the estimated peak power at the current sampling time, wherein the first power attenuation step value is used for representing an attenuation degree of the estimated peak power at the current sampling time; and a third determining unit which uses the difference value between the estimated peak power at the current sampling time and the first power attenuation step value as an estimated peak power at the next sampling time after the current sampling time when the estimated peak power at the current sampling time is greater than the first power attenuation step value.

Further, the third determining unit is used for setting the estimated peak power at the next sampling time after the current sampling time to be 0 when the estimated peak power at the current sampling time is less than or equal to the first power attenuation step value.

Further, the apparatus also comprises a calculating unit which is used for multiplying the delayed sampling power by an attenuation coefficient to obtain an attenuation step value of the estimated peak power at the current sampling time when the delayed sampling power is greater than the estimated peak power at the current sampling time, wherein the attenuation coefficient is greater than 0 and less than 1; and when the delayed sampling power is less than or equal to the estimated peak power at the current sampling time, using the first power attenuation step value as an attenuation step value of the estimated peak power at the next sampling time after the current sampling time.

Further, the attenuation coefficient is a constant value or gradually decreases with the sampling time.

Further, the first comparing unit is also used for comparing the sampling power at the previous sampling time with the estimated peak power at the current sampling time before the sampling power at the current sampling time is compared with the estimated peak power at the current sampling time; the first determining unit is also used for determining that the sampling power at the previous sampling time is estimated peak power at the current sampling time when the sampling power at the previous sampling time is greater than the estimated peak power at the previous sampling time. The second comparing unit is used for comparing the estimated peak power at the previous sampling time with a second power attenuation step value when the sampling power at the previous sampling time is less than or equal to the estimated peak power at the previous sampling time, wherein the second power attenuation step value is used for representing an attenuation degree of the estimated peak power at the previous sampling time; the third determining unit uses the difference value between the estimated peak power at the previous sampling time and the second power attenuation step value as the estimated peak power at the current sampling time when the estimated peak power at the previous sampling time is greater than the second power attenuation step value; and the third determining unit is also used for setting the estimated peak power at the current sampling time to be 0 when the estimated peak power at the previous sampling time is less than or equal to the second power attenuation step value.

On the other hand, the invention provides an apparatus for determining a peak-to-average power ratio, and the apparatus comprises: an average calculating unit which is used for calculating an average power at a current sampling time; a peak power determining apparatus which is used for determining the actual peak power at the current sampling time; a power ratio calculating unit which is used for dividing the actual peak power at the current sampling time by the average power at the current sampling time to obtain a peak-to-average power ratio at the current sampling time.

Further, the average power at the current sampling time is obtained by the average calculating unit according to the following formula:

$$P_{avg}(kT)=(1-u_2)\cdot P_{avg}(kT-T)+u_2\cdot P_s(kT)$$

wherein, kT represents the current sampling time, $P_{avg}(kT)$ represents the average power at the current sampling time, T represents a sampling period, $P_{avg}(kT-T)$ represents the average power at the previous sampling time before the current sampling time, $P_s(kT)$ represents the sampling power at the current sampling time, $u_2$ represents a weight coefficient of the sampling power at the current sampling time, and $u_2$ is greater than 0 and less than 1.

In the embodiment of the invention, the sampling power at the current sampling time is compared with the estimated peak power at the current sampling time, so that whether the sampling power at the current sampling time is the peak power can be determined. Only one comparison is needed, and comparisons between the sampling power and each previous sampling power one by one are not needed, the detection efficiency of the peak power is improved, and the peak power at each sampling time can be determined in a real-time manner.

BRIEF DESCRIPTION OF THE DRAWINGS

Embodiments will hereinafter be described in conjunction with the appended drawings, where like designations denote like elements, and.

DESCRIPTION

This disclosure, its aspects and embodiments, are not limited to the specific components, assembly procedures or method elements disclosed herein. Many additional components, assembly procedures and/or method elements known in the art consistent with the intended peak power and peak-to-average power ratio systems and related methods will become apparent for use with particular embodiments from this disclosure. Accordingly, for example, although particular embodiments are disclosed, such embodiments and implementing components may comprise any shape, size, style, type, model, version, measurement, concentration, material, quantity, method element, step, and/or the like as is known in the art for such peak power and peak-to-average power ratio systems and related methods, and implementing components and methods, consistent with the intended operation and methods:

In the description of the invention, it should be noted that the orientation or position relationship indicated by the terms "center", "upper", "lower", "left", "right", "vertical", "horizontal", "inner", "outer" and the like is the orientation or position relationship based on the drawings, for convenience of description and simplified description only, not indicating or implying that the apparatus or element referred must have a particular orientation or be constructed and operated in a particular orientation, and therefore should not be construed as limiting the invention. In addition, the terms "first", "second" and "third" are used merely for describing purposes, and should not be understood to indicate or imply relative importance.

In the description of the invention, it should be noted that, unless otherwise expressly specified or defined, the terms "mounted," "connected with", and "connected to" should be understood in a broad sense, which for example, may be fixed connection, or detachable connection, or integral connection, may be mechanical connection or electrical connection, may be direct connection, or indirect connection through intermediate structures, or may be the communication between the interiors of two elements, or may be wireless connection or wired connection. Those of ordinary skilled in the art can understand the specific meanings of the above terms in the invention as the case may be.

Moreover, the technical features involved in different embodiments of the invention described below can be combined with each other in the case of no conflict.

Embodiment 1

Figure 1:
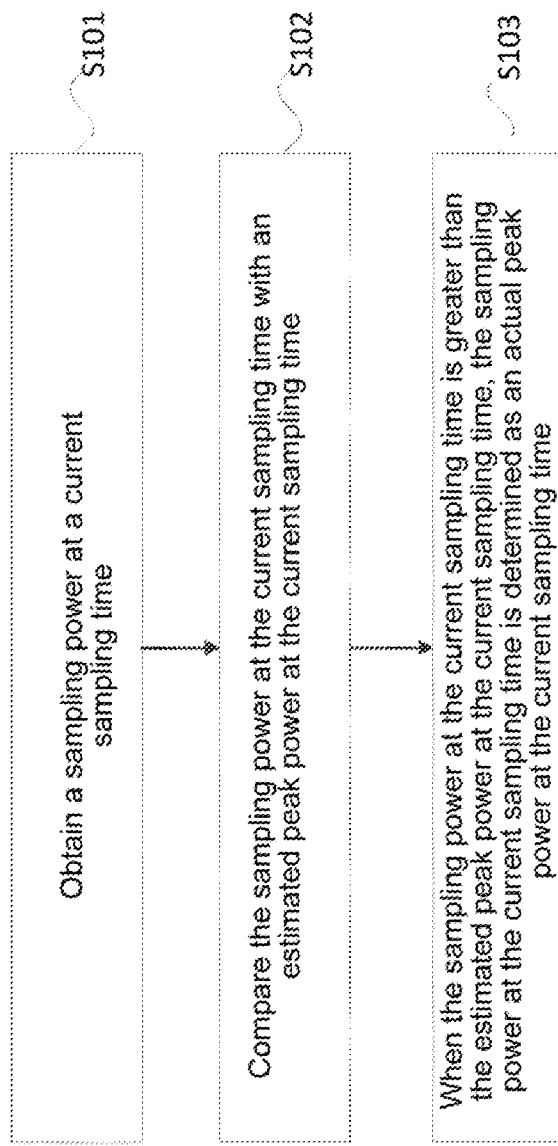
FIG. 1 is a flow chart of a specific example of a method for determining a peak power in an embodiment 1 of the invention.

The embodiment provides a method for determining a peak power, as shown in FIG. 1. The method comprises the following steps of:

Step S101, obtaining a sampling power at a current sampling time. In the embodiment, the sampling power of each sampling signal can be the sampling power at the current sampling time of the sampling. During each sampling, the voltage or the current of the signal at the current sampling time can be sampled, and then the sampling power can be calculated. When sampling is performed again, the time of newly-performed sampling is taken as the current sampling time.

Step S102, comparing the sampling power at the current sampling time with an estimated peak power at the current sampling time. If the current sampling time is kT, the previous sampling time is (kT−T), wherein, k represents the ordinal of the current sampling, and T is a sampling period. The estimated peak power at the previous sampling time can be the actual peak power at the previous sampling time or the peak power obtained through the attenuation calculation of the previous peak power, wherein, the estimated peak power at the previous sampling time can be considered as the peak power before the current sampling time in an effective time period.

Step S103, when the sampling power at the current sampling time is greater than the estimated peak power at the current sampling time, determining that the sampling power at the current sampling time is an actual peak power at the current sampling time. In the embodiment, the sampling power at the current sampling time is compared with the estimated peak power at the current sampling time. If the sampling power at the current sampling time is greater, the sampling power value at the current sampling time is the maximum in the current effective time period, namely the sampling power is the actual peak power at the current sampling time.

In the embodiment of the invention, the sampling power at the current sampling time is compared with the estimated peak power at the current sampling time, so that whether the sampling power at the current sampling time is the peak power can be determined. Only one comparison is needed, and comparisons between the sampling power and each previous sampling power one by one are not needed, the detection efficiency of the peak power is improved, and the peak power at each sampling time can be determined in a real-time manner.

Preferably, the method further comprises the steps of: when the sampling power at the current sampling time is less than or equal to the estimated peak power at the current sampling time, determining that an actual peak power at a previous sampling time is an actual peak power at the current sampling time.

The actual peak power at the previous sampling time can be the same as or different from the estimated peak power at the previous sampling time. Since the peak power has time efficiency, the longer the elapsed time, the less the influence on the subsequent signals. In the embodiment, the actual peak power determined at each sampling time can be stored, so that in the comparative judgement for the next time, if the sampling power at the next sampling time is less than or equal to the estimated peak power at the next sampling time, the actual peak power at the previous sampling time is determined as the actual peak power at the sampling time.

It should be noted that in the embodiment of the invention, "when the sampling power at the current sampling time is less than or equal to the estimated peak power at the current sampling time, determining that an actual peak power at a previous sampling time is an actual peak power at the current sampling time" is only a preferable embodiment. Other embodiments can also be adopted in the invention, for example, when the sampling power at the current sampling time is less than or equal to the estimated peak power at the current sampling time, the estimated peak power at the previous sampling time is determined as the actual peak power at the current sampling time. The invention does not limit for this.

Preferably, after the sampling power at the current sampling time is obtained, the method further comprises the following steps of: delaying the sampling power at the current sampling time by N sampling periods, wherein N is greater than 0; and wherein, the step of comparing the sampling power at the current sampling time with the estimated peak power at the current sampling time comprises: comparing the delayed sampling power with the estimated peak power at the current sampling time, and when the delayed sampling power is greater than the estimated peak power at the current sampling time, determining that the sampling power at the current sampling time is greater than the estimated peak power at the current sampling time.

In the embodiment, the sampling delay number N can be any non-negative integer, the main purpose of which is to enable the sample participating in the calculation of the average power to cover not only the historical values currently participating in the peak value search sampling, but also the subsequent N samples.

When the sampling power is compared, the delayed sampling power is compared with the estimated peak power at the current sampling time, and the subsequent steps are performed according to the comparison result.

Preferably, the method further comprises the following steps of: when the delayed sampling power is greater than the estimated peak power at the current sampling time, determining that the delayed sampling power is an estimated peak power at the current sampling time; when the delayed sampling power is less than or equal to the estimated peak power at the current sampling time, comparing the estimated peak power at the current sampling time with a first power attenuation step value, wherein the first power attenuation step value is used for representing an attenuation degree of the estimated peak power at the current sampling time; and when the estimated peak power at the current sampling time is greater than the first power attenuation step value, using the difference value between the estimated peak power at the current sampling time and the first power attenuation step value as an estimated peak power at the next sampling time.

The method further comprises the steps of: when the estimated peak power at the current sampling time is less than or equal to the first power attenuation step value, setting the estimated peak power at the next sampling time to be 0. In the embodiment, the estimated peak power at the next sampling time is determined, wherein the estimated peak power is used for determining the actual peak power at the next sampling time. Specifically, three situations are comprised: 1). if the delayed sampling power is greater than the estimated peak power at the current sampling time, the delayed sampling power is used as an estimated peak power at the next sampling time; 2). if the delayed sampling power is greater than the estimated peak power at the current sampling time and the estimated peak power at the current sampling time is greater than the first power attenuation step value, the difference value between the estimated peak power at the current sampling time and the first power attenuation step value is used as an estimated peak power at the next sampling time; and 3). if the delayed sampling power is greater than the estimated peak power at the current sampling time and the estimated peak power at the current sampling time is greater than the first power attenuation step value, the estimated peak power at the next sampling time is 0.

In the embodiment, since the current estimated peak power becomes less and less "time-efficient" when participating in the peak value comparison search, the weight of the current peak power becomes smaller and smaller as time elapses. In the embodiment, the first power attenuation step value is used for indicating the attenuation degree of the estimated peak power at the current sampling time, namely the power attenuation value at the next sampling time, of the estimated peak power at the current sampling time.

According to the embodiment of the invention, the estimated peak power at the next sampling time is calculated for determining the actual peak power at the next sampling time, so that the estimated peak power obtained at the previous sampling time can be utilized to determine the corresponding actual peak power at each sampling time. Real-time determination of peak power can be realized, and a foundation for the real-time calculation of the peak-to-average power ratio is further provided.

Preferably, the method further comprises the steps of: when the delayed sampling power is greater than the estimated peak power at the current sampling time, multiplying the delayed sampling power by an attenuation coefficient to obtain an attenuation step value of the estimated peak power at the next sampling time, wherein the attenuation coefficient is greater than 0 and less than 1; and when the delayed sampling power is less than or equal to the estimated peak power at the current sampling time, using the first power attenuation step value as an attenuation step value of the estimated peak power at the next sampling time.

For the current sampling time, calculation of the attenuation step value of the estimated peak power at the next sampling time is necessary for calculating the actual peak power at the next sampling time. In the embodiment, when the delayed sampling power is greater than the estimated peak power at the current sampling time, preferably, the corresponding attenuation step value is obtained by using a proportional coefficient, namely the delayed sampling power is multiplied by an attenuation coefficient to obtain the attenuation step value of the estimated peak power at the next sampling time. Further, the attenuation coefficient is a constant value between 0 and 1 or gradually decreases with the sampling time. For example, when a constant value is used, the attenuation coefficient can be 0.4; or the attenuation coefficient can also be a time-dependent function, such as $1/e^t$, wherein e is a natural coefficient, and t is time.

Preferably, before comparing the sampling power at the current sampling time with the estimated peak power at the current sampling time, the method further comprises the steps of: S1, comparing the sampling power at the previous sampling time with an estimated peak power at the previous sampling time; S2, when the sampling power at the previous sampling time is greater than the estimated peak power at the previous sampling time, determining that the sampling power at the previous sampling time is the estimated peak power at the current sampling time; S3, when the sampling power at the previous sampling time is less than or equal to the estimated peak power at the previous sampling time, comparing the estimated peak power at the previous sampling time with a second power attenuation step value, wherein the second power attenuation step value is used for representing an attenuation degree of the estimated peak power at the previous sampling time; S4, when the estimated peak power at the previous sampling time is greater than the second power attenuation step value, using the difference value between the estimated peak power at the previous sampling time and the second power attenuation step value as the estimated peak power at the current sampling time; and S5, when the estimated peak power at the previous sampling time is less than or equal to the second power attenuation step value, setting the estimated peak power at the current sampling time to be 0.

In the embodiment, the estimated peak power at the current sampling time is obtained at the previous sampling time, wherein, the calculation process of the estimated peak power at the current sampling time is the same as the calculation process of the estimated peak power at the next sampling time in the above embodiment. The difference lies in the change in the calculation data, namely the calculating time node is shifted forward by one sampling period, the data at the current sampling time is replaced with the data at the previous sampling time, and the data at the next sampling time is replaced with the data at the current sampling time. The specific calculation process can be analogized by the calculation process of the estimated peak power at the next sampling time in the above embodiment, and will not be described herein again.

Embodiment 2

Figure 2:
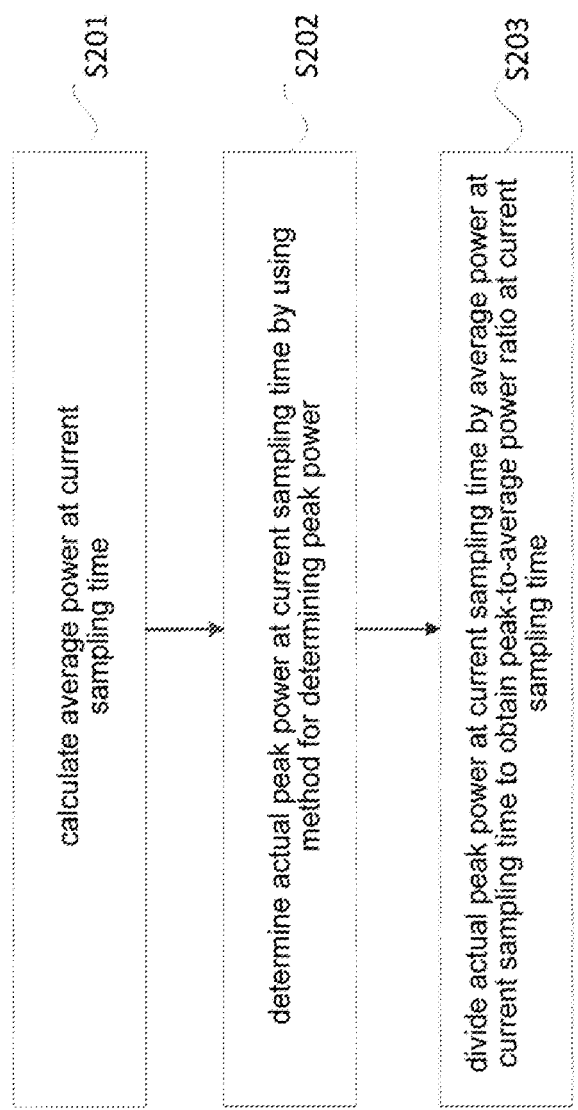
FIG. 2 is a flow chart of a specific example of a method for determining a peak-to-average power ratio in an embodiment 2 of the invention.

The embodiment of the invention further provides a method for determining a peak-to-average power ratio, and the method can be used for calculating the peak-to-average power ratio in a real-time manner. As shown in FIG. 2, the method for determining a peak-to-average power ratio comprises the following steps of S201, calculating an average power at a current sampling time; S202, determining the actual peak power at the current sampling time by using the method for determining the peak power; and S203, dividing the actual peak power at the current sampling time by the average power at the current sampling time to obtain a peak-to-average power ratio at the current sampling time.

The method for determining the peak power refers to the method for determining the peak power, described in the above embodiment. In the embodiment, an average power and the actual peak power at the current sampling time are calculated in a real-time manner, so that the peak-to-average power ratio at the current sampling time can be calculated, and the purpose of calculating the peak-to-average power ratio in a real-time manner is realized.

Preferably, the average power at the current sampling time is obtained by the following formula:

$$P_{avg}(kT)=(1-u_2) \cdot P_{avg}(kT-T)+u_2 \cdot P_s(kT)$$

wherein, kT represents the current sampling time, $P_{avg}(kT)$ represents the average power at the current sampling time, T represents a sampling period, $P_{avg}(kT-T)$ represents the average power at the previous sampling time before the current sampling time, $P_s(kT)$ represents the sampling power at the current sampling time, $u_2$ represents a weight coefficient of the sampling power at the current sampling time, and $u_2$ is greater than 0 and less than 1.

An alternative embodiment of the invention is described below with reference to FIG. 3. The sampling value of the received signal at a sampling time kT is x(kT), wherein x(kT) can be current or voltage. The instantaneous sampling power of the received signal at the sampling time kT is $P_s(kT)$, which is equal to current sampling energy. Assuming that the sampling time kT is calculated from 0, the data is initialized first: initializing the current estimated peak power $P_P(0)$ and the latched actual peak power $P_P^*(0)$ to 0; initializing the attenuation step value $P_d(0)$ (namely the first attenuation step value) of the current peak power to 0; and initializing the current average power $P_{avg}(0)$ to $P_{avg\_init}$.

Figure 3:
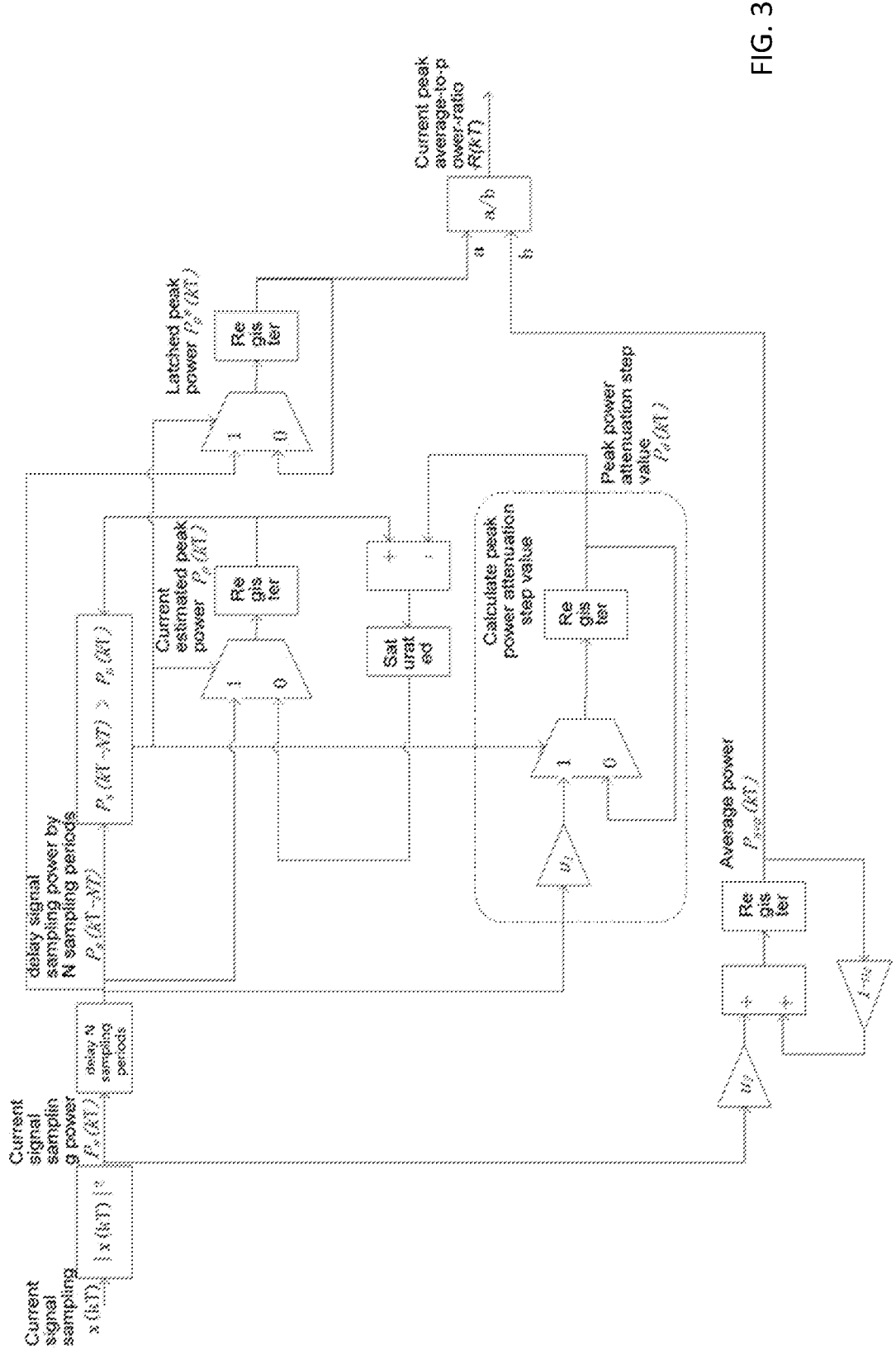
FIG. 3 is a flow chart of another specific example of the method for determining the peak-to-average power ratio in the embodiment 2 of the invention.

As shown in FIG. 3, the main calculation process comprises the following steps of: S31, calculating the instantaneous sampling power $P_s(kT)$ at the current sampling time kT (the resistance is ignored here):

$$P_s(kT)=|x(kT)|^2;$$

S32, updating the average power $P_{avg}(kT)$:

$$P_{avg}(kT)=(1-u_2) \cdot P_{avg}(kT-T)+u_2 \cdot P_s(kT)$$

S33, updating the attenuation step value $P_d(kT)$ of the peak power:

$$P_d(kT+T) = \begin{cases} u_1 \cdot P_s(kT-NT), & P_s(kT-NT) > P_p(kT) \\ P_d(kT), & P_s(kT-NT) \leq P_p(kT) \end{cases}$$

S34, updating the estimated peak power $P_p(kT)$:

$$P_d(kT+T) = \begin{cases} P_s(kT-NT), & P_s(kT-NT) > P_p(kT) \\ P_p(kT) - P_d(kT), & P_s(kT-NT) \leq P_p(kT) \text{ and } P_p(kT) > P_d(kT) \\ 0, & P_s(kT-NT) \leq P_p(kT) \text{ and } P_p(kT) \leq P_d(kT) \end{cases}$$

S35, updating the latched actual peak power $P_p^*(kT)$:

$$P_p^*(kT+T) = \begin{cases} (kT-NT), & P_s(kT-NT) > P_p(kT) \\ P_p^*(kT), & P_s(kT-NT) \leq P_p(kT) \end{cases}$$

S36, calculating the peak-to-average ratio $R(kT)$:

$$R(kT) = \frac{P_p^*(kT)}{P_{avg}(kT)}$$

S38, enabling k=k+1, starting calculation from S31, and performing S31 to S36 in sequence repeatedly.

In an actual communication system, sometimes the specific value of the peak-to-average power ratio is not concerned. In such a situation, the latched actual peak power $P_p^*(kT)$ and average power $P_{avg}(kT)$ are output. The initial value $P_{avg\_init}$ of the average power can be set according to the empirical knowledge, or can be set to 0 or the maximum positive number ($P_{avg}(kT)$ is represented by w bit, and then $P_{avg\_init}$ can be set to (2w−1). The sampling delay number N can be any non-negative integer, the main purpose of which is to enable the sample participating in the calculation of the average power to cover not only the historical values currently participating in the peak value search sampling, but also the subsequent N samples. In an average estimation algorithm, a simple first-order low-pass infinite impulse response filter is adopted. The closer an parameter $u_2$ is to 0, the better the smoothing effect is, but the speed of tracking the variations in an average is lower; and the closer the parameter $u_2$ is to 1, the stronger the ability of tracking the variations in average is, but the smoothing effect is worse. The embodiment of the invention does not exclude using other methods to calculate the average power. Updating the attenuation step value $P_d(kT)$ of the peak power is used for simulating that the current estimated peak value becomes less and less "time-efficient" when participating in the peak value comparison search, namely the weighting of the current estimated peak value $P_p(kT)$ becomes smaller and smaller as time elapses. In the calculation process and the steps, the attenuation step value is estimated by scaling down $P_s(kT-NT)$ at a newly searched peak value (namely $P_s(kT-NT) > P_s(kT)$) by $u_2$. The invention does not exclude that other methods can be adopted to estimate the attenuation step value $P_d(kT)$ of the peak value, or other non-linear methods can be adopted to simulate the feature of weighting reduction of the peak value, such as exponential attenuation.

Compared with a common method for calculating the searched peak value in a segmented sampling manner, the method for determining the peak power provided by the embodiment of the invention has the characteristic of simpler calculation. Each time a new sample arrives, whether the current sampling power is a new peak value or not can be estimated by only one comparison operation, and comparisons with a segment of stored sampling power one by one are not needed. In the invention, the peak-to-average ratio can be output continuously, and the burst peak power can be quickly reflected in the output, which has great significance for the automatic gain adjustment of burst frame communication, and can help automatic gain control to identify an impulse interference in a very short time, so that relevant suppression measures can be taken in a timely manner.

Embodiment 3

Figure 4:
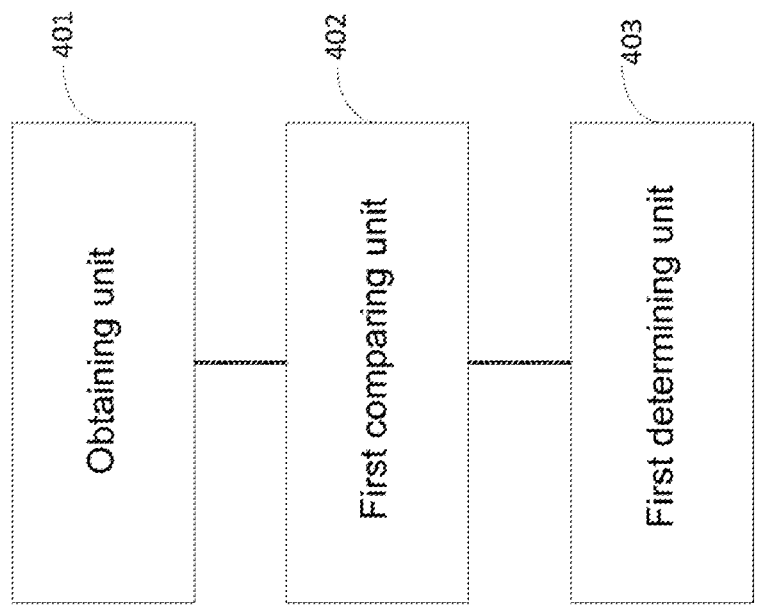
FIG. 4 is a schematic diagram of a specific example of an apparatus for determining the peak power in an embodiment 3 of the invention.

The invention provides an apparatus for determining peak power, and as shown in FIG. 4, the apparatus for determining peak power comprises an obtaining unit 401, a first comparing unit 402 and a first determining unit 403. The obtaining unit 401 is used for obtaining a sampling power at a current sampling time.

In the embodiment, the sampling power of each sampling signal can be the sampling power at the current sampling time of the sampling. During each sampling, the voltage or the current of the signal at the current sampling time can be sampled, and then the sampling power can be calculated. When sampling is performed again, the time of newly-performed sampling is taken as the current sampling time.

The first comparing unit 402 is used for comparing the sampling power at the current sampling time with an estimated peak power at the current sampling time.

If the current sampling time is kT, the previous sampling time is (kT-T), wherein, T is a sampling period. The estimated peak power at the previous sampling time can be the actual peak power at the previous sampling time or the peak power obtained through the attenuation calculation of the previous peak power, wherein, the estimated peak power at the previous sampling time can be considered as the peak power before the current sampling time in an effective time period.

The first determining unit 403 is used for determining that the sampling power at the current sampling time is an actual peak power at the current sampling time when the sampling power at the current sampling time is greater than the estimated peak power at the current sampling time.

In the embodiment, the sampling power at the current sampling time is compared with the estimated peak power at the current sampling time. If the sampling power at the current sampling time is greater, the sampling power value at the current sampling time is the maximum in the current effective time period, namely the sampling power is the actual peak power at the current sampling time.

In the embodiment of the invention, the sampling power at the current sampling time is compared with the estimated peak power at the current sampling time, so that whether the sampling power at the current sampling time is the peak power can be determined. Only one comparison is needed, and comparisons between the sampling power and each previous sampling power one by one are not needed, the detection efficiency of the peak power is improved, and the peak power at each sampling time can be determined in a real-time manner.

Preferably, the first determining unit is also used for determining that an actual peak power at a previous sampling time is an actual peak power at the current sampling time when the sampling power at the current sampling time is less than or equal to the estimated peak power at the current sampling time.

The actual peak power at the previous sampling time can be the same as or different from the estimated peak power at the previous sampling time. Since the peak power has time efficiency, the longer the elapsed time, the less the influence on the subsequent signals. In the embodiment, the actual peak power determined at each sampling time can be stored, so that in the comparative judgement for the next time, if the sampling power at the next sampling time is less than or equal to the estimated peak power at the next sampling time, the actual peak power at the previous sampling time is determined as the actual peak power at the sampling time.

Preferably, the apparatus also comprises a delaying unit which is used for, after the sampling power at the current sampling time is obtained, delaying the sampling power at the current sampling time by N sampling periods, wherein N is greater than 0; and the first comparing unit is used for comparing the delayed sampling power with the estimated peak power at the current sampling time, and when the delayed sampling power is greater than the estimated peak power at the current sampling time, determining that the sampling power at the current sampling time is greater than the estimated peak power at the current sampling time.

In the embodiment, the sampling delay number N can be any non-negative integer, the main purpose of which is to enable the sample participating in the calculation of the average power to cover not only the historical values currently participating in the peak value search sampling, but also the subsequent N samples.

When the sampling power is compared, the delayed sampling power is compared with the estimated peak power at the current sampling time, and the subsequent steps are performed according to the comparison result.

Preferably, the apparatus also comprises a second determining unit which is used for determining that the delayed sampling power is an estimated peak power at the next sampling time after the current sampling time when the delayed sampling power is greater than the estimated peak power at the current sampling time; a second comparing unit which is used for comparing the estimated peak power at the current sampling time with a first power attenuation step value when the delayed sampling power is less than or equal to the estimated peak power at the current sampling time, wherein the first power attenuation step value is used for representing an attenuation degree of the estimated peak power at the current sampling time; and a third determining unit which uses the difference value between the estimated peak power at the current sampling time and the first power attenuation step value as an estimated peak power at the next sampling time after the current sampling time when the estimated peak power at the current sampling time is greater than the first power attenuation step value.

Further, the third determining unit is used for setting the estimated peak power at the next sampling time after the current sampling time to be 0 when the estimated peak power at the current sampling time is less than or equal to the first power attenuation step value.

In the embodiment, the estimated peak power at the next sampling time is determined, wherein the estimated peak power is used for determining the actual peak power at the next sampling time. Specifically, three situations are comprised: 1). If the delayed sampling power is greater than the estimated peak power at the current sampling time, the delayed sampling power is used as an estimated peak power at the next sampling time; 2). if the delayed sampling power is greater than the estimated peak power at the current sampling time and the estimated peak power at the current sampling time is greater than the first power attenuation step value, the difference value between the estimated peak power at the current sampling time and the first power attenuation step value is used as an estimated peak power at the next sampling time; and 3). if the delayed sampling power is greater than the estimated peak power at the current sampling time and the estimated peak power at the current sampling time is greater than the first power attenuation step value, the estimated peak power at the next sampling time is 0.

In the embodiment, since the current estimated peak power becomes less and less "time-efficient" when participating in the peak value comparison search, the weight of the current peak power becomes smaller and smaller as time elapses. In the embodiment, the first power attenuation step value is used for indicating the attenuation degree of the estimated peak power at the current sampling time, namely the power attenuation value at the next sampling time, of the estimated peak power at the current sampling time.

According to the embodiment of the invention, the estimated peak power at the next sampling time is calculated for determining the actual peak power at the next sampling time, so that the estimated peak value obtained at the previous sampling time can be utilized to determine the corresponding actual peak power at each sampling time. Real-time determination of peak power can be realized, and a foundation for the real-time calculation of the peak-to-average power ratio is further provided.

Preferably, the apparatus also comprises a calculating unit which is used for multiplying the delayed sampling power by an attenuation coefficient to obtain an attenuation step value of the estimated peak power at the current sampling time when the delayed sampling power is greater than the estimated peak power at the current sampling time, wherein the attenuation coefficient is greater than 0 and less than 1; and when the delayed sampling power is less than or equal to the estimated peak power at the current sampling time, using the first power attenuation step value as an attenuation step value of the estimated peak power at the next sampling time after the current sampling time.

For the current sampling time, calculation of the attenuation step value of the estimated peak power at the next sampling time is necessary for calculating the actual peak power at the next sampling time. In the embodiment, when the delayed sampling power is greater than the estimated peak power at the current sampling time, preferably, the corresponding attenuation step value is obtained by using a proportional coefficient, namely the delayed sampling power is multiplied by an attenuation coefficient to obtain the attenuation step value of the estimated peak power at the next sampling time. Further, the attenuation coefficient is a constant value between 0 and 1 or gradually decreases with the sampling time. For example, when a constant value is used, the attenuation coefficient can be 0.4; or the attenuation coefficient can also be a time-dependent function, such as $1/e^t$, wherein e is a natural coefficient, and t is time.

Preferably, the first comparing unit is also used for comparing the sampling power at the previous sampling time with the estimated peak power at the current sampling time before the sampling power at the current sampling time is compared with the estimated peak power at the current sampling time.

The first determining unit is used for determining that the sampling power at the previous sampling time is an estimated peak power at the current sampling time when the sampling power at the current sampling time is greater than the estimated peak power at the previous sampling time.

The second comparing unit is also used for comparing the estimated peak power at the previous sampling time with a second power attenuation step value when the sampling power at the previous sampling time is less than or equal to the estimated peak power at the previous sampling time, wherein the second power attenuation step value is used for representing an attenuation degree of the estimated peak power at the previous sampling time.

The third determining unit uses the difference value between the estimated peak power at the previous sampling time and the second power attenuation step value as the estimated peak power at the current sampling time when the estimated peak power at the previous sampling time is greater than the second power attenuation step value.

The third determining unit is also used for setting the estimated peak power at the current sampling time to be 0 when the estimated peak power at the previous sampling time is less than or equal to the second power attenuation step value.

In the embodiment, the estimated peak power at the current sampling time is obtained at the previous sampling time, wherein, the calculation process of the estimated peak power at the current sampling time is the same as the calculation process of the estimated peak power at the next sampling time in the above embodiment. The difference lies in the change in the calculation data, namely the calculating time node is shifted forward by one sampling period, the data at the current sampling time is replaced with the data at the previous sampling time, and the data at the next sampling time is replaced with the data at the current sampling time. The specific calculation process can be analogized by the calculation process of the estimated peak power at the next sampling time in the above embodiment, and will not be described herein again.

Embodiment 4

The embodiment provides an apparatus for determining a peak-to-average power ratio, and the apparatus can be used for executing the method for determining the peak-to-average power ratio described in the embodiment 2. The apparatus for determining the peak-to-average power ratio comprises an average calculating unit which is used for calculating an average power at a current sampling time; a peak power determining unit which is used for determining the actual sampling power at the current sampling time; and a power ratio calculating unit which is used for dividing the actual peak power at the current sampling time by the average power at the current sampling time to obtain a peak-to-average power ratio at the current sampling time.

The apparatus for determining the peak power refers to the apparatus for determining the peak power, described in the embodiment 3. In the embodiment, an average power and the actual peak power at the current sampling time are calculated in a real-time manner, so that the peak-to-average power ratio at the current sampling time can be calculated, and the purpose of calculating the peak-to-average power ratio in a real-time manner is realized.

Preferably, the average power at the current sampling time is obtained by the average calculating unit according to the following formula:

$$P_{avg}(kT)=(1-u_2) \cdot P_{avg}(kT-T)+u_2 \cdot P_s(kT)$$

wherein, kT represents the current sampling time, $P_{avg}(kT)$ represents the average power at the current sampling time, T represents a sampling period, $P_{avg}(kT-T)$ represents the average power at the previous sampling time before the current sampling time, $P_s(kT)$ represents the sampling power at the current sampling time, $u_2$ represents a weight coefficient of the sampling power at the current sampling time, and $u_2$ is greater than 0 and less than 1.

Those skilled in the art should understand that the embodiments of the invention may be embodied as a method, a system or a computer program product. Accordingly, the invention may be embodied in the form of an entirely hardware embodiment, an entirely software embodiment or an embodiment combining software and hardware. Furthermore, the invention may be embodied in the form of a computer program product executed in one or more computer readable storage mediums (including but not limited to a disk memory, a CD-ROM, an optical memory, and the like) having computer readable program codes.

The invention is described with reference to a flow chart and/or a block diagram of the method, the apparatus (system) and the computer program product according to the embodiments of the invention. It should be understood that respective flows and/or blocks in the flow chart and/or the block diagram and the combinations of the flows and/or the blocks in the flow chart and/or the block diagram can be embodied in computer program instructions. These computer program instructions can be loaded onto a general-purpose computer, a specific-purpose computer, an embedded processor or a processor of other programmable data processing apparatuses to create a machine, so that the instructions executed on the computer or the processor of the other programmable data processing apparatuses can create an apparatus for performing the functions specified in the flow(s) of the flow chart and/or the block(s) of the block diagram.

These computer program instructions can also be stored in a computer readable memory capable of directing the computer or the other programmable data processing apparatuses to work in a specific manner, so that the instructions stored in the computer readable memory can create a manufactured article including an instruction apparatus which can realize the functions specified in the flow(s) of the flow chart and/or the block(s) of the block diagram.

These computer program instructions can also be loaded onto the computer or the other programmable data processing apparatuses so that a series of operation steps can be performed on the computer or the other programmable data processing apparatuses to create computer implemented processing, and thereby the instructions executed on the computer or the other programmable apparatuses provide steps for realizing the functions specified in the flow(s) of the flow chart and/or the block(s) of the block diagram.

Evidently, the above embodiments are merely exemplary for clear illustration, and are not intended to be limitation. Those of ordinary skilled in the art can make other different forms of modifications or variations based on the above description. Exhaustivity of all embodiments is unnecessary and unreachable. Evident modifications and variations made thereto still fall within the scope of protection of the invention.

What is claimed is:

1. A method for determining a peak power, comprising:
obtaining a power estimation at a current sampling time using an obtaining unit;
delaying the power estimation at the current sampling time by N sampling periods using a delaying unit, wherein N is greater than 0;

comparing the delayed power estimation with an estimated peak power at the current sampling time using a first comparing unit; and when the delayed power estimation is greater than the estimated peak power at the current sampling time, determining that the power estimation at the current sampling time is an actual peak power at the current sampling time using a first determining unit, and multiplying the delayed power estimation by an attenuation coefficient using a calculating unit to obtain an attenuation step value of the estimated peak power at the next sampling time after the current sampling time, wherein the attenuation coefficient is greater than 0 and less than 1;

when the delayed power estimation is less than or equal to the estimated peak power at the current sampling time, subtracting a first power attenuation step value from the estimated peak power at the current sampling time using a second comparing unit, wherein the first power attenuation step value is used for representing an attenuation degree of the estimated peak power at the current sampling time, and using the first power attenuation step value as an attenuation step value of the estimated peak power at the next sampling time after the current sampling time using the first determining unit.

2. The method of claim 1, further comprising:
when the delayed power estimation is less than or equal to the estimated peak power at the current sampling time, determining that an actual peak power at a previous sampling time is an actual peak power at the current sampling time using the first determining unit.

3. The method of claim 1, further comprising:
when the delayed power estimation is greater than the estimated peak power at the current sampling time, determining that the delayed power estimation is an estimated peak power at the next sampling time after the current sampling time using a second determining unit.

4. The method of claim 1, wherein the attenuation coefficient is a constant value or gradually decreases along with the sampling time.

5. A method for determining a peak-to-average power ratio, comprising:
calculating an average power at a current sampling time using an average value calculating unit;
determining an actual peak power at the current sampling time according to the method of claim 1 by using a peak power determining unit; and
dividing the actual peak power at the current sampling time by the average power at the current sampling time to obtain a peak-to-average power ratio at the current sampling time using a power ratio calculating unit.

6. The method of claim 5, wherein:
the average power at the current sampling time is calculated using the following formula:

$$P_{avg}(kT) = (1-u_2) \cdot P_{avg}(kT-T) + u_2 \cdot P_s(kT)$$

wherein, kT represents the current sampling time, $P_{avg}(kT)$ represents the average power at the current sampling time, T represents a sampling period, $P_{avg}(kT-T)$ represents the average power at the previous sampling time before the current sampling time, $P_s(kT)$ represents the power estimation at the current sampling time, $u_2$ represents a weight coefficient of the power estimation at the current sampling time, and $u_2$ is greater than 0 and less than 1.

7. An apparatus for determining a peak power comprising:
an obtaining unit configured to receive a power estimation at a current sampling time;
a delaying unit configured to delay the power estimation at the current sampling time by N sampling periods after the power estimation at the current sampling time is obtained, wherein N is greater than 0;
a first comparing unit configured to compare the delayed power estimation with an estimated peak power at the current sampling time;
a first determining unit configured to determine that the power estimation at the current sampling time is an actual peak power at the current sampling time when the delayed power estimation is greater than the estimated peak power at the current sampling time;
a second comparing unit configured to subtract a first power attenuation step value from the estimated peak power at the current sampling time when the delayed power estimation is less than or equal to the estimated peak power at the current sampling time, wherein the first power attenuation step value is used for representing an attenuation degree of the estimated peak power at the current sampling time; and
a calculating unit configured to multiply the delayed power estimation by an attenuation coefficient to obtain an attenuation step value of the estimated peak power at the next sampling time after the current sampling time when the delayed power estimation is greater than the estimated peak power at the current sampling time, wherein the attenuation coefficient is greater than 0 and less than 1, and configured to use the first power attenuation step value as an attenuation step value of the estimated peak power at the next sampling time after the current sampling time when the delayed power estimation is less than or equal to the estimated peak power at the current sampling time.

8. The apparatus of claim 7, wherein the first determining unit is also configured to determine that an actual peak power at a previous sampling time is an actual peak power at the current sampling time when the delayed power estimation is less than or equal to the estimated peak power at the current sampling time.

9. The apparatus of claim 8, further comprising:
a second determining unit configured to determine that the delayed power estimation is an estimated peak power at the next sampling time after the current sampling time when the delayed power estimation is greater than the estimated peak power at the current sampling time.

* * * * *